United States Patent Office 3,592,851
Patented July 13, 1971

3,592,851
2′-AMINO-2-BENZOYL-BENZENESULFON-ANILIDES
John B. Wright, Kalamazoo, Mich., assignor to The Upjohn Company, Kalamazoo, Mich.
No Drawing. Original application May 16, 1968, Ser. No. 638,768, now Patent No. 3,464,996, dated Sept. 2, 1969. Divided and this application May 16, 1969, Ser. No. 825,415
Int. Cl. C07c *143/78*
U.S. Cl. 260—556     3 Claims

ABSTRACT OF THE DISCLOSURE 6H-dibenzo[c,g][1,2,5]thiadiazocine - 5,5 - dioxides and a method of preparation which involves the condensation of a 2-benzoylbenzenesulfonyl halide with an o-phenylene diamine to produce a 2′-amino-2-benzoyl-benzenesulfonanilide and the subsequent cyclodehydration of said condensation product is disclosed.

These compounds are useful as starting materials for the preparation of bleaching agents, antiseptics, disinfectants, mothproofing agents, and/or herbicides; they are also useful as antidiabetic agents, antiallergic agents, central nervous system stimulants, coccidiostats, and ultraviolet light filters.

CROSS-REFERENCE TO RELATED APPLICATIONS

This application is a division of U.S. Ser. No. 638,768, filed on May 16, 1967, now Patent No. 3,464,996, issued Sept. 2, 1969.

BACKGROUND OF THE INVENTION

Neither the 6H-dibenzo[c,g][1,2,5]thiadiazocine-5,5-dioxides disclosed nor the 2′-amino-2-benzoylbenzenesulfonanilides claimed herein have been reported previously in the literature.

BRIEF SUMMARY OF THE INVENTION

The compounds contemplated herein can be represented by the structural formula

I
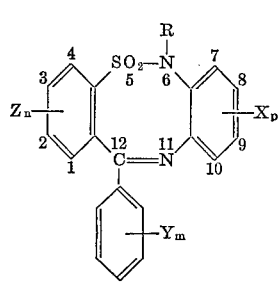

wherein X, Y, and Z can be halo, trifluoromethyl, alkyl, or alkoxy radicals and R can be hydrogen, alkyl, aralkyl, alkanoyl, alkylaminoalkyl, 1-pyrrolidinylalkyl, alkyl-substituted 1-pyrrolidinylalkyl, piperidinoalkyl, alkyl-substituted piperidinoalkyl, hexahydro-1-azepinylalkyl, or alkyl-substituted hexahydro-1-azepinylalkyl radical. The respective alkyl portions of the foregoing radicals contain no more than four carbon atoms, however, and $n$, $m$, and $p$ are integers having a value from 0 to 3, inclusive.

These compounds are useful as starting materials for the preparation of bleaching agents, antiseptics, disinfectants, mothproofing agents, and/or herbicides; they are also useful as antidiabetic agents, antiallergic agents, central nervous system stimulants, coccidiostats, and ultraviolet light filters.

The 2′-amino-2-benzoylbenzenesulfonanilides are useful, in turn, as starting materials for the preparation of the 6H-dibenzo[c,g][1,2,5]thiadiazocine-5,5-dioxides.

DETAILED DESCRIPTION

The compounds of the present invention, shown by Formula I, can be prepared by condensing, under reflux conditions, a 2-benzoylbenzenesulfonyl halide represented by the structural formula II
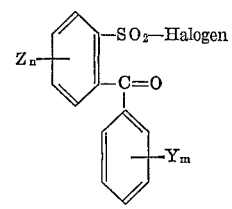

with an o-phenylene diamine represented by the structural formula

III
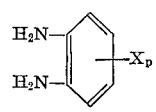

in a suitable aromatic solvent such as benzene, toluene, or the like, to produce a 2′-amino-2-benzoylbenzenesulfonanilide which can be shown by the formula IV
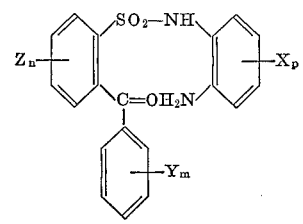

wherein Z, Y, X, $m$, $n$, and $p$ have the same meaning as above. The compounds represented by Formula IV are then cyclodehydrated in an acid medium and under reflux conditions to produce the corresponding 6H-dibenzo [c,g][1,2,5]thiadiazocine-5,5-dioxide. An aromatic solvent such as benzene, toluene, xylene, and the like, can be employed. Suitable acids are p-toluene sulfonic acid, concentrated sulfuric acid, phosphoric acid, aluminum trichloride, and the like.

In Formulas I, II, III, and IV illustrative alkyl radicals are methyl, ethyl, propyl, isopropyl, butyl, isobutyl, sec.-butyl, and tert.-butyl; illustrative aralkyl radicals are benzyl, phenylethyl, naphthylethyl, phenylbutyl, and the like; illustrative alkoxy radicals are methoxy, ethoxy, the propoxy, and the butoxy radicals; and illustrative alkanoyl radicals are formyl, acetyl, propionyl, butyryl, and the like.

Similarly, illustrative alkylaminoalkyl radicals are (methylamino)ethyl,
2-(diethylamino)ethyl,
3-(diethylamino)propyl,
4-(diethylamino)butyl,
4-(N-methyl-N-ethylamino)butyl,
2-(isopropylamino)ethyl,
2-(diisopropylamino)ethyl,
4-(tert.-butylamino)butyl,
and the like; illustrative alkyl-substituted 1-pyrrolidinyl-alkyl radicals are
2-(2-methyl-1-pyrrolidinyl)ethyl,
3-(2-methyl-1-pyrrolidinyl)propyl,
2-(2,2,4-trimethyl-1-pyrrolidinyl)ethyl,
(2-methyl-1-pyrrolidinyl)methyl,
4-(2,4-diethyl-1-pyrrolidinyl)butyl, 4-(2-butyl-4-ethyl-1-pyrrolidinyl)butyl
2-(3-tert.-butyl-1-pyrrolidinyl)ethyl, and the like; illustrative alkyl-substituted piperidinoalkyl radicals are 2-(2-methylpiperidino)ethyl,
2-(3-methylpiperidino)ethyl,
2-(4-methylpiperidino)ethyl,
4-(3-isopropylpiperidino)butyl,
4-(4-tert.-butylpiperidino)butyl,
3-(2-methyl-5-ethylpiperidino)propyl,
2-(2,3,4-triethylpiperidino)ethyl,
4-(2,4,6-trimethylpiperidino)butyl, and the like; and illustrative alkyl-substituted hexahydro-1-azepinylalkyl radicals are 2-(2-ethyl-hexahydro-1-azepinyl)ethyl,
2-(4-tert.-butyl-hexahydro-1-azepinyl)ethyl,
4-(2,4-dimethylhexahydro-1-azepinyl)butyl,
3-(3,3-dimethylhexahydro-1-azepinyl)propyl,
2-(2,4,6-tri-n-propylhexahydro-1-azepinyl)ethyl,
and the like.

Illustrative halo radicals contemplated herein are fluoro, chloro, bromo, and iodo.

The cyclodehydrated product produced in the aforedescribed manner is a 12-phenyl-6H-dibenzo[c,g][1,2,5]thiadiazocine-5,5-dioxide. An organic side chain can be placed on the nucleus of the foregoing compound in lieu of the hydrogen existing in the 6-position by reacting the cyclodehydrated product with an organic halide, the organic portion of which is the desired side chain. The addition of the side chain is usually carried out under reflux conditions in a suitable aqueous solvent and in the presence of an alkali metal hydroxide such as sodium hydroxide, potassium hydroxide, and the like.

Those of the foregoing compounds represented by Formula 1 which contain a basic side chain in the 6-position, i.e., the compounds where R is alkylaminoalkyl, 1-pyrrolidinylalkyl, alkyl-substituted 1-pyrroldinylalkyl, piperidinoalkyl, alkyl-substituted piperidinoalkyl, hexahydro-1-azepinylalkyl, or alkyl-substituted hexahydro-1-azepinylalkyl radical, can also exist in the protonated or acid addition salt form. Stable acid addition salts can be formed with acids such as hydrochloric, hydrobromic, sulfuric, phosphoric, nitric, acetic, benzoic, salicyclic, glycolic, succinic, nicotinic, tartaric, maleic, malic, pamoic, methanesulfonic, picric, cyclohexane sulfamic, lactic, and the like.

The 2-benzoylbenzenesulfonyl halides (II) can be prepared in accordance with the procedure set forth in Ramsen et al., Am. Chem. J., 17, 354 (1895). In addition, 2-aminobenzophenones (V) can be reacted with nitrous acid and then with sulfur dioxide and a cupric halide in an acid medium, e.g., hydrochloric acid, to produce the corresponding 2-benzoylbenzenesulfonyl halides as is illustrated below in the preparation of 2-benzoylbenzenesulfonyl chlorides:

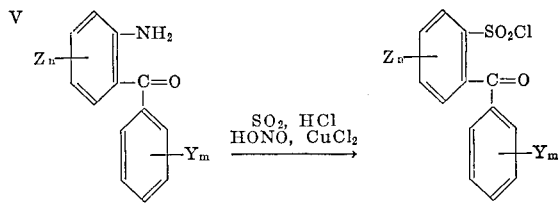

Thus, 2-benzoyl-6-bromobenzenesulfonyl chloride can be derived from 2-amino-3-bromobenzophenone, 2-benzoyl-5-bromobenzenesulfonyl chloride from 2-amino-4-bromobenzophenone,
2-benzoyl-4'-bromobenzenesulfonyl chloride from 2-amino-4'-bromobenzophenone,
2-benzoyl-4-bromobenzenesulfonyl chloride from 2-amino-5-bromobenzophenone,
2-benzoyl-3-bromobenzenesulfonyl chloride from 2-amino-6-bromobenzophenone,
2-benzoyl-4,6-dibromobenzenesulfonyl chloride from 2-amino-3,5-dibromobenzophenone,
2-benzoyl-4-bromo-2'-fluorobenzenesulfonyl chloride from 2-amino-2'-fluoro-5-bromobenzophenone,
2-benzoyl-4-bromo-5-methoxybenzenesulfonyl chloride from 2-amino-4-methoxy-5-bromobenzophenone,
2-benzoyl-4-bromo-4'-methylbenzenesulfonyl chloride from 2-amino-4'-methyl-5-bromobenzophenone,
2-benzoyl-2'-chlorobenzenesulfonyl chloride from 2-amino-2'-chlorobenzophenone,
2-benzoyl-6-chlorobenzenesulfonyl chloride from 2-amino-3-chlorobenzophenone,
2-benzoyl-5-chlorobenzenesulfonyl chloride from 2-amino-4-chlorobenzophenone,
2-benzoyl-4'-chlorobenzenesulfonyl chloride from 2-amino-4'-chlorobenzophenone,
2-benzoyl-4-chlorobenzenesulfonyl chloride from 2-amino-5-chlorobenzophenone,
2-benzoyl-3-chlorobenzenesulfonyl chloride from 2-amino-6-chlorobenzophenone,
2-benzoyl-2',4-dichlorobenzenesulfonyl chloride from 2-amino-2',5-dichlorobenzophenone,
2-benzoyl 4,6-dichlorobenzenesulfonyl chloride from 2-amino-3,5-dichlorobenzophenone,
2-benzoyl-4,5-dichlorobenzenesulfonyl chloride from 2-amino-4,5-dichlorobenzophenone,
2-benzoyl-4,5'-dichlorobenzenesulfonyl chloride from 2-amino-4',5-dichlorobenzophenone,
2-benzoyl-4-chloro-2'-fluorobenzenesulfonyl chloride from 2-amino-2'-fluoro-5-chlorobenzophenone,
2-benzoyl-4-chloro-3'-fluorobenzenesulfonyl chloride from 2-amino-3'-fluoro-5-chloro-benzophenone,
2-benzoyl-4-chloro-4'-fluorobenzenesulfonyl chloride from 2-amino-4'-fluoro-5-chlorobenzophenone,
2-benzoyl-4-methyl-2'-chlorobenzenesulfonyl chloride from 2-amino-2'-chloro-5-methylbenzophenone,
2-benzoyl-4'-methyl-3'-chlorobenzenesulfonyl chloride from 2-amino-3'-chloro-4'-methylbenzophenone.

In a like manner, 2-amino-2'-chloro-4,5-dimethylbenzophenone yields 2-benzoyl-4,5-dimethyl-2'-chlorobenzenesulfonyl chloride,
2-amino-2',4'-dichloro-4,5-dimethylbenzophenone yields 2-benzoyl-4,5-dimethyl-2',4'-dichlorobenzenesulfonyl chloride,
2-amino-2',5'-dichloro-4,5-dimethylbenzophenone yields 2-benzoyl-4,5-dimethyl-2',5'-dichlorobenzenesulfonyl chloride,
2-amino-2'-methoxy-5-chlorobenzophenone yields 2-benzoyl-4-chloro-2'-methoxybenzenesulfonyl chloride,
2-amino-4'-methoxy-5-chlorobenzophenone yields 2-benzoyl-4-chloro-4'-methoxybenzenesulfonyl chloride,
2-amino-2'-methoxy-5-chloro-5'-methylbenzophenone yields 2-benzoyl-5'-methyl-4-chloro-2'-methoxybenzenesulfonyl chloride,
2-amino-2'-fluorobenzophenone yields 2-benzoyl-2'-fluorobenzenesulfonyl chloride,
2-amino-4'-fluorobenzophenone yields 2-benzoyl-4'-fluorobenzenesulfonyl chloride,
2-amino-5-fluorobenzophenone yields 2-benzoyl-4-fluorobenzenesulfonyl chloride,
2-amino-2'-fluoro-5-methylbenzophenone yields 2-benzoyl-4-methyl-2'-fluorobenzenesulfonyl chloride,
2-amino-2'-trifluoromethylbenzophenone yields 2-benzoyl-2'-trifluoromethylbenzenesulfonyl chloride,
2-amino-3-trifluoromethylbenzophenone yields 2-benzoyl-6-trifluoromethylbenzenesulfonyl chloride,
2-amino-3'-trifluoromethylbenzophenone yields 2-benzoyl-3'-trifluoromethylbenzenesulfonyl chloride,
2-amino-4-trifluoromethylbenzophenone yields 2-benzoyl-5-trifluoromethylbenzenesulfonyl chloride,
2-amino-2',5-di(trifluoromethyl)benzophenone yields 2-benzoyl-2',4-di(trifluoromethyl)benzenesulfonyl chloride.

Similarly, 2-amino-2'-methoxybenzophenone produces 2-benzoyl-2'-methoxybenzenesulfonyl chloride, 2-amino-4-methoxybenzophenone produces 2-benzoyl-5-methoxybenzenesulfonyl chloride, 2-amino-4'-methoxybenzophenone produces 2-benzoyl-4'-methoxybenzenesulfonyl chloride, 2-amino-5-methoxybenzophenone produces 2-benzoyl-4-methoxybenzenesulfonyl chloride, 2-amino-2',4-dimethylbenzophenone produces 2-benzoyl-2',5-dimethoxybenzenesulfonyl chloride, 2-amino-3,4-dimethoxybenzophenone produces 2-benzoyl-5,6-dimethoxybenzenesulfonyl chloride, 2-amino-3',4'-dimethoxybenzophenone produces 2-benzoyl-3',4'-dimethoxybenzenesulfonyl chloride, 2-amino-4,4',5-trimethoxybenzophenone produces 2-benzoyl-4,4',5-trimethoxybenzenesulfonyl chloride, 2-amino-2',5-dimethyl-3'-methoxybenzophenone produces 2-benzoyl-2',4-dimethyl-3'-methoxybenzenesulfonyl chloride, 2-amino-2',3'-dimethyl-4'-methoxyphenone produces 2-benzoyl-4'-methoxy-2',3'-dimethylbenzenesulfonyl chloride, 2-amino-2',5'-dimethyl-4'-methoxybenzophenone produces 2-benzoyl-2',5'-dimethyl-4'-methoxybenzenesulfonyl chloride, 2-amino-2',5'-dimethyl-5-methoxybenzophenone produces 2-benzoyl-4-methoxy-2',5'-dimethylbenzenesulfonyl chloride, 2-amino-2'-methyl-5-methoxybenzophenone produces 2-benzoyl-4-methoxy-2'-methylbenzenesulfonyl chloride, 2-amino-3,4-dimethylbenzophenone produces 2-benzoyl-5,6-dimethylbenzenesulfonyl chloride, 2-amino-3-propyl-5-butylbenzophenone produces 2-benzoyl-4-butyl-6-propylbenzenesulfonyl chloride, 2-amino-4-ethyl-4'-butylbenzophenone produces 2-benzoyl-4'-butyl-5-ethylbenzenesulfonyl chloride, etc.

Methods for preparation of 2-aminobenzophenones are taught by Lothrop et al., J. Am. Chem. Soc. 65, 363 (1943) and Sternbach et al., J. Org. Chem. 27, 3781 and 3788 (1962).

Initially a solution of 2-aminobenzophenone, acetic acid, and concentrated hydrochloric acid can be prepared and another solution of sodium nitrite in water. The former can then be added to the latter with stirring. To the resulting solution, one can add an aqueous solution of sulfur dioxide and cuprous chloride. After warming and stirring, the entire resulting admixture is poured on cracked ice and the 2-benzoylbenzenesulfonyl chloride recovered as a pale yellow solid which can be recrystallized from cyclohexane.

The o-phenylenediamines can be prepared by methods well known in the art. For example, compounds shown by Formula III can be prepared by nitrating a 1-alkyl-4-bromobenzene, treating the resulting 1-alkyl-4-bromo-3-nitrobenzene with alcoholic ammonia so as to produce the corresponding 1-alkyl-4-amino-3-nitrobenzene and then reducing the latter to obtain 4-alkyl-1,2-phenylenediamine. The reaction conditions are set forth in Karrer et al., Helv. Chim. Acta 17, 1516 (1934), showing the preparation of 4-ethyl-1,2-phenylenediamine from 4-bromo-1-ethylbenzene.

In addition, 4,5-dialkyl-1,2-phenylenediamines can be prepared by nitrating the corresponding 1,2-dialkylbenzenes to yield the corresponding 3,4-dialkylaniline, converting the obtained aniline to the corresponding urethane, nitrating and then hydrolyzing the latter to produce the corresponding 4,5-dialkyl-2-nitroaniline, and then reducing the produced nitro compound to the 4,5-dialkyl-1,2-phenylenediamine. Typical reaction conditions for the above preparation are shown by Lamboy, J. Am. Chem. Soc. 71, 3756 (1949).

Illustrative o-phenylenediamines are 4-methyl-1,2-phenylenediamine,
4,5-dimethyl-1,2-phenylenediamine,
4-ethyl-1,2-phenylenediamine,
4,5-diethyl-1,2-phenylenediamine,
4-propyl-1,2-phenylenediamine,
4,5-dipropyl-1,2-phenylenediamine,
4,5-diisopropyl-1,2-phenylenediamine,
4-tert.-butyl-1,2-phenylenediamine,
4,5-dibutyl-1,2-phenylenediamine,
and the like.

The overall synthetic route for the preparation of the compounds of this invention is schematically illustrated below in the preparation of 2-chloro-6-methyl-12-phenyl-6H-dibenzo[c,g][1,2,5]thiadiazocine-5,5-dioxide:

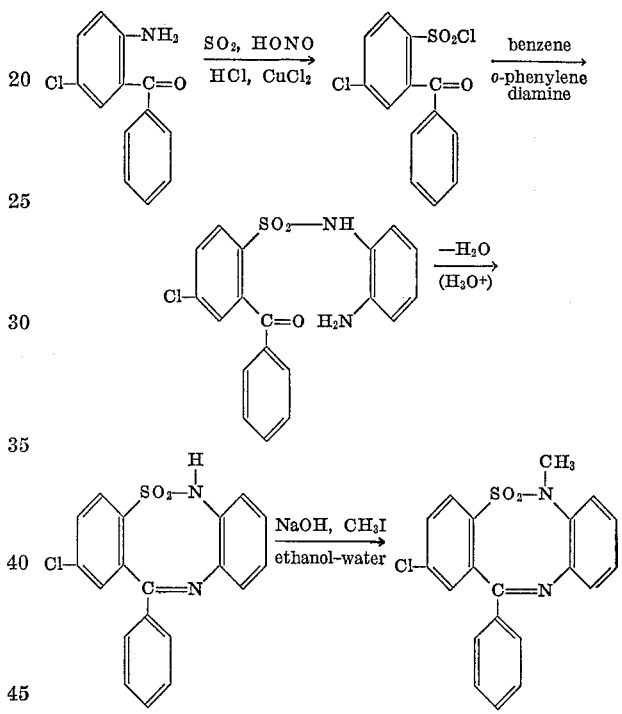

Compounds represented by Formula I where R is hydrogen can be reacted with chlorine to produce active chlorine compounds in which the hydrogen is replaced by chlorine. These active chlorine compounds are useful as bleaching agents, antiseptics, and disinfectants similar to the compounds disclosed in U.S. Pat. 3,115,495.

In addition, compounds of the type shown by Formula I where R is alkyl, aralkyl, alkanoyl, or hydrogen are also useful as antidiabetic agents in mammals.

Compounds of Formula I where R is alkylaminoalkyl are useful as coccidiostats in fowl.

The acid addition salts of compounds represented by Formula I and where R is a heterocyclic aminoalkyl group, i.e., 1-pyrrolidinylalkyl, alkyl-substituted 1-pyrrolidinylalkyl, piperidinoalkyl, alkyl-substituted piperidinoalkyl, 1-azepinylalkyl or alkyl-substituted 1-azepinylalkyl are useful as central nervous system stimulants in mammals and as antiallergic agents.

Compounds represented by Formula I where R is a basic side chain form salts with fluosilic acid. Such salts are useful as mothproofing agents in accordance with the teachings of U.S. Pat. 1,915,334 and U.S. Pat. 2,075,359. These compounds also form salts with thiocyanic acid which, in turn, condense with formaldehyde and produce resinous materials useful as pickling inhibitors according to U.S. Pat. 2,525,320 and U.S. Pat. 2,606,155. Similarly, compounds of Formula I where R is a basic side chain form salts with trichloroacetic acid which are useful as herbicides against Johnson grass, yellow foxtail, green foxtail, Bermuda grass, quack grass, and the like.

In addition, all compounds of the type shown by Formula I can be reduced catalytically with hydrogen and using platinum or Raney nickel as a catalyst so as to produce 11,12-dihydro derivatives. The catalytic reduction produces an amino nitrogen at the 11-position which can be reacted with fluosilic acid, thiocyanic acid, or trichloroacetic acid as above.

Compounds of the type shown by Formula I have been found to absorb ultraviolet light in the 280 to 300 m$\mu$ range and thus are useful as filters for ultraviolet light of the foregoing wave lengths.

Compounds of the type shown by Formula IV are useful as intermediates for the preparation of compounds of Formula I as disclosed herein.

This invention is further illustrated by the following examples:

EXAMPLE I

*Preparation of 2'-amino-2-benzoyl-4-chloro benzenesulfonanilide*

A mixture of 2-benzoyl - 4 - chlorobenzenesulfonyl chloride (about 15.75 grams, 0.05 mole), 0-phenylenediamine (about 27 grams, 0.25 mole), and benzene (about 300 milliliters), was refluxed for about two hours, cooled and filtered. The resulting filter cake was taken up in benzene and extracted with a 1 weight percent NaOH solution (about 500 mililiters total). The basic extract was then acidified with acetic acid.

A precipitate was formed as a result and was recovered by means of filtration. The resulting filter cake was washed with water. After washing, about 19 grams of a tan solid melting at 168° to 171° C. was obtained. The solid was identified as 2'-amino-2-benzoyl - 4 - chlorobenzenesulfonanilide obtained in about 98 percent yield.

*Analysis.*—For $C_{19}H_{15}ClN_2O_3S$: Calcd. (percent): C, 58.99; H, 3.91; Cl, 9.16; N, 7.24; S, 8.29. Found (percent): C, 59.26; H, 3.93; Cl, 9.21; N, 7.45; S, 8.50.

EXAMPLE II

*Preparation of 2-chloro-12-phenyl-6H-dibenzo[c,g]- [1,2,5]thiadiazocine-5,5-dioxide*

2'-amino - 2 - benzoyl - 4 - chlorobenzenesulfonanilide (about 19.35 grams, 0.05 mole), p-toluenesulfonic acid (about 2 grams), and toluene (about 150 mililiters) were admixed and refluxed under a water trap for about 20 hours. The theoretical amount of water for the dehydration of the 2'-amino-2-benzoyl-4-chlorobenzenesulfonanilide (about 0.9 milliliter) was collected in the water trap.

The mixture obtained was then extracted with a weak ammonium hydroxide solution (weight ratio of $NH_3$ to $H_2O$ about 1:20), to remove any remaining p-toluenesulfonic acid from the mixture, and thereafter with water.

The remaining toluene layer was dried over $MgSO_4$ and concentrated. The thus obtained concentrate was dissolved in anhydrous diethyl ether and further treated with ethereal-HCl to remove any remaining starting material. The resulting solution was filtered and the obtained ethereal mother liquors were concentrated. About 13.8 grams of a brown solid melting at 173.5° to 177.50 C. was obtained. Recrystallization from ethanol yielded a solid in the form of tan prisms melting at 180° to 181° C. The solid was identified as 2-chloro-12-phenyl-6H-dibenzo-[c,g][1,2,5]thiadiazocine-5,5-dioxide, obtained in about 75 percent yield.

*Analysis.*—For $C_{19}H_{13}ClH_2O_2S$: Calcd. (percent): C, 61.87; H, 3.55; Cl, 9.61; N, 7.60; S, 8.69. Found (percent): C, 61.55; H, 3.89; Cl, 9.73; N, 7.34; S, 8.73.

By means of a mass spectrogram the molecular weight (parent $m/e$ peak) of the prepared compound was found to be 368.

EXAMPLE III

*Preparation of 2'-amino-2-benzoyl-benzenesulonanilide*

A mixture of 2-benzoylbenzensulfonyl chloride (about 14 grams, 0.05 mole), o-phenylenediamine (about 27 grams, 0.025 mole), and benzene (about 300 milliliters) was placed in a suitable reaction vessel, refluxed with stirring for about two hours, and thereafter cooled and filtered.

The resulting filter cake was partitioned between benzene and a 1 weight percent aqueous solution of sodium hydroxide. The resulting aqueous layer was separated, and the benzene layer extracted with an additional amount of 1 weight percent aqueous solution of sodium hydroxide.

Both aqueous layers obtained in the aforedescribed manner were then combined and acidified with acetic acid while being cooled and stirred. A precipitate was formed, recovered by means of filtration, and washed with water. Upon recrystallization of the precipitate from ethyl acetate about 11.3 grams of yellow prisms melting at 180° to 189° C. were produced. The yellow prisms were identified as 2'-amino-2-benzoylbenzenesulfonanilide, obtained in about 64 percent yield.

*Analysis.*—For $C_{19}H_{16}N_2O_3S$: Calcd. (percent): C, 64.76; H, 4.58; N, 7.95; S, 9.10. Found (percent): C, 64.86; H, 4.31; N, 7.80; S, 9.34.

EXAMPLE IV

*Preparation of 12-phenyl-6H-dibenzo[c,g][1,2,5]- thiadiazocine-5,5-dioxide*

A solution of 2'-amino-2-benzoylbenzenesulfonanilide (8.8 grams, 0.025 mole) in dry toluene (about 100 milliliters) was pepared and refluxed for about one-half hour at which time p-toluenesulfonic acid (about 0.25 gram) was added. Thereafter, the resulting admixture was refluxed under a water trap for about eight hours. During this time period, the theoretical amount of water for the cyclization of the 2'-amino-2-benzoylbenzenesulfonanilide was collected.

The thus-obtained mixture of reactants and reaction products was filtered, the filtrate washed with a dilute aqueous ammonium hydroxide solution (weight ratio of $NH_3$ to $H_2O=1:20$) and then water. After washing with water, the filtrate was dried over $MgSO_4$ and concentrated by evaporation. The remaining solid residue was recrystallized from ethanol as yellow prismatic crystals melting at 165.5° to 170° C. About 7.05 grams of crystals were produced. Two additional recrystallizations from 95 weight percent ethanol gave yellow prismatic crystals melting at 169° to 170.5° C. The crystals were identified as 12-phenyl-6H-dibenzo[c,g][1,2,5]thiadiazocine-5,5-dioxide, obtained in about 85 percent yield.

*Analysis.*—For $C_{19}H_{14}N_2O_2S$: Calcd. (percent): C, 68.24; H, 4.22; N, 8.38; S, 9.59. Found (percent): C, 68.07; H, 4.39; N, 8.21; S, 9.44.

I claim:

1. A 2'-amino - 2 - benzoylbenzenesulfonanilide represented by the formula

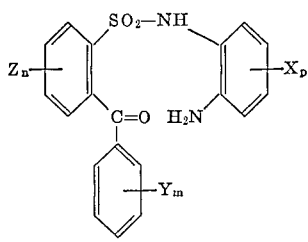

wherein X, Y and Z are members of the group consisting of halo, trifluoromethyl, alkyl, and alkoxy radicals and $m$, $n$, and $p$ are integers having a value from 0 to 3, inclusive, with the proviso that the alkyl portions of the foregoing radicals contain no more than four carbon atoms.

2. The 2'-amino - 2 - benzoylbenzenesulfonanilide in accordance with claim 1 wherein Z is chloro situated in the 4-position, $n$ has a value of 1, and $m$ and $p$ have a value of zero.

3. The 2'-amino - 2 - benzoylbenzenesulfonanilide in accordance with claim 1 wherein $n$, $m$, and $p$ have a value of zero.

References Cited

Morrison, et al.: Org. Chem. (Allyn & Bacon, Boston, 1959), pp. 561–2.

HENRY R. JILES, Primary Examiner

C. M. SHURKO, Assistant Examiner

U.S. Cl. X.R.

260—295.5